US005589718A

United States Patent [19]

Lee

[11] Patent Number: 5,589,718

[45] Date of Patent: Dec. 31, 1996

[54] POWER LINE CONDITIONER

[75] Inventor: Noel Lee, Daly City, Calif.

[73] Assignee: Monster Cable International, Ltd., Hamilton, Bermuda

[21] Appl. No.: 422,442

[22] Filed: Apr. 14, 1995

[51] Int. Cl.[6] .................... H02J 1/00

[52] U.S. Cl. .................... 307/72; 307/85; 307/86; 307/87; 307/18; 307/29; 307/38; 307/39; 439/92; 439/105; 439/620; 439/535

[58] Field of Search .................... 307/85, 86, 87; 307/18, 29, 38, 39; 439/92, 105, 620, 535

[56] References Cited

U.S. PATENT DOCUMENTS 5,115,368 5/1992 Smith .................... 361/56

5,448,443 9/1995 Muelleman .................... 361/111

*Primary Examiner*—William M. Shoop, Jr.

*Assistant Examiner*—Kim Lockett

*Attorney, Agent, or Firm*—Haynes and Boone, L.L.P.

[57] ABSTRACT

A power line conditioner in which a plurality of outlets are mounted on a housing for receiving AC plugs from a plurality of electrical components. The housing is connected to a source of AC power which is distributed to each of the outlets, with the AC power associated with the outlets being processed to improve the performance of the components connected to the outlets. The AC power processing at one or more of the outlets differs from the processing at one or more of the other outlets so that the outlets can accommodate components with different electrical characteristics.

3 Claims, 1 Drawing Sheet

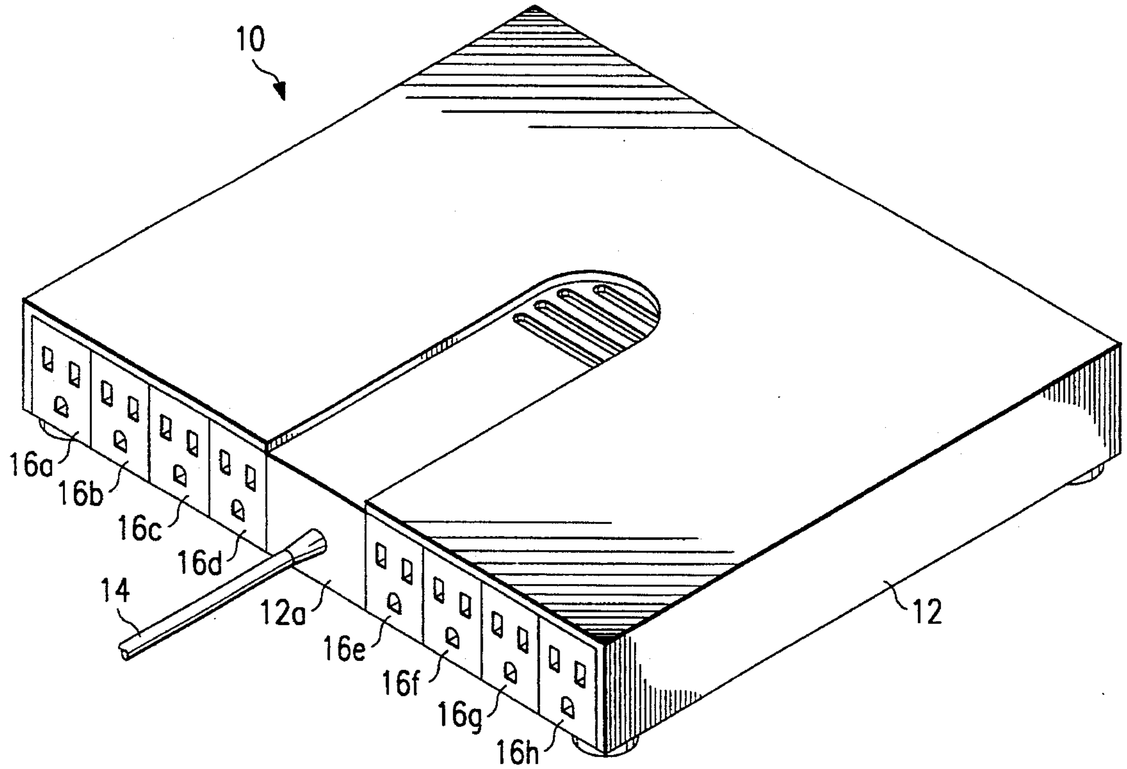
10
16a
16b
16c
16d
14
12a
16e
16f
16g
16h
12

POWER LINE CONDITIONER

BACKGROUND OF THE INVENTION

This invention relates to a power line conditioner and, more particularly, to a power line conditioner strip containing a plurality of alternating current ("AC") outlets for receiving electrical components.

In home and business applications in which several components must be connected to an AC outlet, a conveniently-located power strip is often provided which is connected to the wall outlet for receiving AC power from the outlet and which has several AC outlets for receiving the AC plugs from the various components to distribute the AC power to the components.

However, the AC power that is provided by the electric utility for the home or business is often fraught with noise, distortions, and other electronic pollution due to its proximity to industrial equipment, street lights, transformers, elevators, radio stations and home appliances. In audio/video systems, for example, this contaminated power input can cause a degradation in the reproduced audio and/or video signals. Also, ground loops often cause hum in the power line, and extreme fluctuations in the power received from the local utility can damage relatively sensitive electronic components.

A still further problem associated with standard home and business AC power is the presence of large current-drawing equipment such as furnaces, air conditioners, refrigerators, etc. which divert power from other electrical components connected to the same circuit, resulting in poor performance of the components. One solution to this problem is to install separate power lines from the main breaker panel to the audio/video equipment. However, this is expensive and still does not guarantee freedom from the noise pollution discussed above.

As a result of the foregoing, the standard power strip has evolved into what is commonly termed a "power line conditioner" which includes several AC outlets, usually of relatively high quality, and which is designed to process the AC power received from the main power line. For example, the power line conditioner often includes circuitry to filter incoming line noise with special non-resonant filters to reduce RF, EMI and other distortions that come through the power line. Also, the conditioners may include special isolation transformers that break the direct link from the signal ground to the power line ground to eliminate ground loops and reduce incoming line noise. Further, many power line conditioners include spike and surge protection with advanced circuit breakers and super-fast acting metal oxide veristors, or the like, to prevent power fluctuations from damaging electronic components. Finally, several conditions also feature power dampers to clamp or control these power fluctuations.

However, since the various components making up an audio or audio/video system often have different electrical characteristics and sensitivities, a "universal" power line conditioner of the above type may not correct the problems in the power input noted above and may even cause damage to the components.

SUMMARY OF THE INVENTION

It is therefore an object of the present invention to provide a power line conditioner which receives AC power from a main power line and which includes a plurality of AC outlets for receiving the AC power plugs from a plurality of electrical components so that the AC power is distributed to the components.

It is a further object of the present invention to provide a power line conditioner of the above type in which the AC power is processed before it is delivered to the components to improve the performance of the electrical components connected to the outlets.

It is a still further object of the present invention to provide a power line conditioner of the above type in which AC power is processed differently at the AC outlets to accommodate electrical components having different characteristics.

Towards the fulfillment of these and other objects, the power line conditioner of the present invention includes a housing for receiving a plurality of AC outlets for receiving the power cords from a plurality of electronic components. Circuitry is associated with each outlet to process the incoming AC power, including line noise filters, isolating transformers, circuit breakers, veristors, and power dampers. According to a feature of the present invention, the circuitry associated with the outlets will vary between some of the outlets so that the AC power is processed differently at each outlet to accommodate electronic components having different characteristics. Also, each of said outlets has a color associated therewith which corresponds to the color associated with one of said components for providing a visual indication of the type of component that should be connected to the outlet.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings which is a perspective view of the power line conditioner of the present invention.

DESCRIPTION OF THE PREFERRED EMBODIMENT

Referring to the drawing, the reference numeral 10 refers, in general, to the power line conditioner of the present invention which includes a housing 12 having an AC cable 14 extending therefrom which extends in a conventional AC wall outlet, or the like to supply electrical power to the conditioner. The housing 12 has a rear plate 12*a*, and eight three-pronged AC outlets 16*a*–16*h* are provided on the plate for receiving the plugs (not shown) from AC cables extending from an equal number of electronic components. It is understood that the AC power delivered to the housing 12 by the AC cable 14 is distributed to each outlet 16*a*–16*h* in a conventional manner.

Although not shown in the drawing, the front plate of the housing 12 could be provided with various indication devices such as an LED status bar, or the like. Also, a power/status button could be provided on the front plate which would function to interrupt the power from the cable 14 to the outlets 16*a*–16*h*, in a conventional manner.

Four feet 18 extend from the bottom plate of the housing 12 and are designed to fit into a tray, or the like, for rack mounting.

Each outlet 16a–16h has one or more or the following circuits associated therewith and located within the interior of the housing for processing the incoming AC power before it is available at the outlet:

1. A non-resonant filter to reduce RF, EMI, and other distortions that are present on the power line to which the conditioner 10 is connected.

2. An isolation transformer to break the direct link form the ground signal to the power line ground to eliminate ground loops and reduce incoming line noise.

3. Advanced circuit breaker and fast-acting metal oxide veristors, or the like, to prevent damage caused by excessive power input.

4. Power dampers to clamp or limit the amount of power input.

Since all of the above-described circuits are conventional, they are not shown in the drawings nor will be described in any further detail.

According to a feature of the invention, the above circuits are associated with different, selected portions of the outlets 16a–16h, in order to process the AC power in accordance with the different characteristics of the electrical components. For example, in an audio/video system, the outlets 16a–16d could be designated for audio source components, and thus would have all four of the circuits set forth above, the outlets 16e and 16f would be designated for video source components and would also have all four of the circuits, while the outlets 16g–16h would be designated for amplifiers and thus would have all of the circuits set forth above with the exception of the isolation transformers, since the latter limit current output.

According to another feature of the present invention, an input designating indicia is associated with each outlet 16a–16h to clearly identify the type of component that should be used with each outlet in accordance with the type of AC power processing associated with the outlet. For example each outlet 16a–16h, and the corresponding portion of the housing containing same would be color-coded to correspond to the particular component to be powered thereby. In fact, a color coding scheme could be imparted to the entire audio-video system including the interconnects that connect the various components. For example, audio program sources, such as CD players, record players, tape decks and AM/FM tuners would be assigned a certain color, such as red, and one or more of the outlets 16a–16d, and the corresponding portion of the housing 10 designed to receive the AC plugs associated with these input sources would also be colored red as well as the AC cord and/or plug attached to the above components. Also the cables that interconnect the above components could have a red designation (whether it be by coloring the cables red or applying a red indicia, such as stripes or rings on the cables or on the connectors attached to the cables). The video source components, and the outlets 16e and 16f, would be assigned another color and the audio amplifiers, and the outlets 16g and 16h would be assigned still another color.

It is thus seen that the power line conditioner of the present invention has several advantages. For example, it includes a plurality of AC outlets for receiving the AC power plugs from a plurality of electronic components, and contains different circuitry for processing the AC power delivered to the components in a different manner, to accommodate components having different characteristics. Also, the present invention enables the various outlets provided to be easily identified and thus insures that each component connected thereto will be connected to an outlet specially designed for the particular electronic characteristics of the component.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A power line conditioner comprising a housing, a plurality of outlets mounted on said housing for receiving AC plugs from a plurality of electrical components, means for connecting said housing to a source of AC power, means for distributing said AC power to each of said outlets, and means associated with said outlets for processing the AC power distributed to said outlets and therefore to the components connected to the outlets to improve the performance of the components, the processing means associated with at least one of said outlets differing from the processing means associated with at least one other outlet so that said outlets can accommodate components with different electrical characteristics, each of said outlets having a color associated therewith which corresponds to the color associated with one of said components for providing a visual indication of the type of component that should be connected to the outlet.

2. The line conditioner of claim 1 wherein said process means includes a filter to reduce distortions in the AC power an isolation transformer to break ground loops and reduce noise, and/or a limiter for limiting the amount of the AC power.

3. The line conditioner of claim 2 wherein said isolation transformer is associated with one or more of said outlets and is not associated with one or more of said outlets.

* * * * *